April 12, 1938.　　　R. S. KNIFFEN　　　2,114,053
RAILWAY TIE CUTTING MACHINE
Original Filed Oct. 21, 1926　　7 Sheets-Sheet 1

Inventor
Roy S. KNIFFEN
By his Attorneys
Paul, Paul & Moore

April 12, 1938. R. S. KNIFFEN 2,114,053
RAILWAY TIE CUTTING MACHINE
Original Filed Oct. 21, 1926 7 Sheets-Sheet 2

Inventor
ROY S. KNIFFEN
By his Attorneys
Paul, Paul & Moore

April 12, 1938.   R. S. KNIFFEN   2,114,053
RAILWAY TIE CUTTING MACHINE
Original Filed Oct. 21, 1926   7 Sheets-Sheet 4

Inventor
Roy S. KNIFFEN
By his Attorneys
Paul, Paul & Moore

April 12, 1938.  R. S. KNIFFEN  2,114,053
RAILWAY TIE CUTTING MACHINE
Original Filed Oct. 21, 1926  7 Sheets-Sheet 6
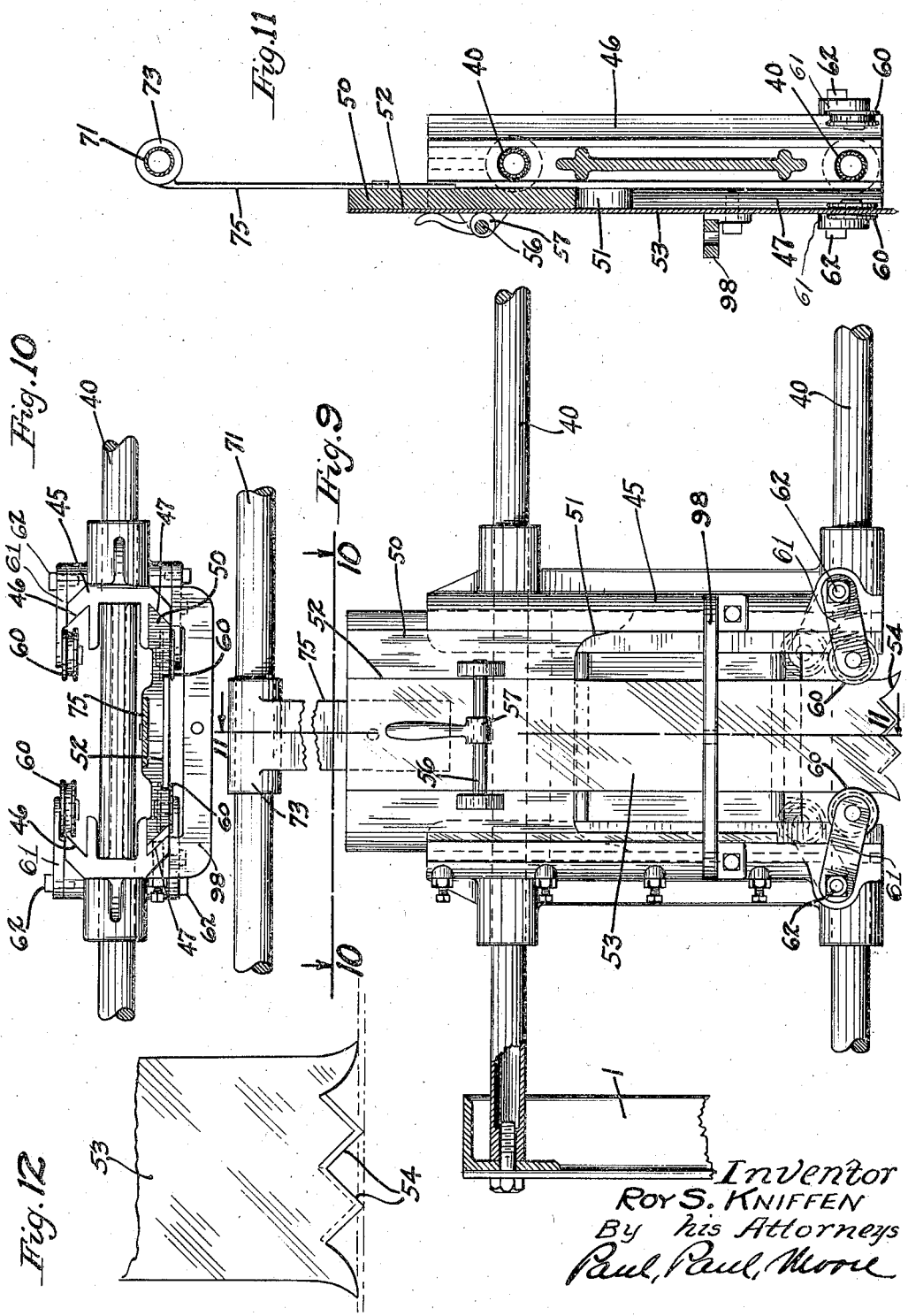

Patented Apr. 12, 1938

2,114,053

UNITED STATES PATENT OFFICE 2,114,053

RAILWAY TIE CUTTING MACHINE

Roy S. Kniffen, Duluth, Minn.

Refiled for abandoned application Serial No. 143,145, October 21, 1926. This application March 1, 1937, Serial No. 128,474

17 Claims. (Cl. 143—60)

This invention relates to apparatus for cutting railway ties, while in rail-supporting position, and at points of severance between the rails, to thereby facilitate removal, in an endwise direction, of those portions of the tie which lie directly beneath the rails. The machine is particularly intended for use in removing old or defective ties so that new and strong ties may be substituted, and to that end simplifies and reduces the cost of this particular railway maintenance problem.

The machine is so designed that it may be operated to cut down through the old tie just inside of each rail so that the cut portions of the tie, particularly the end portions, can be removed without disturbing the ballast or position of the rail, and so that the end sections of the tie can also be removed without first removing a rail chair or plate. Moreover, a tie can be cut and allowed to remain in place so that it will continue to temporarily support the rails because in cutting the tie in this manner neither ballast nor position of tie is disturbed.

With the methods that are in general use at this time, the ballast is removed from along one long side of the tie and partly underneath the same. A trench of sufficient size is dug to permit the tie to be dropped into the trench after being driven in a direction lengthwise of the rails, thus lowering the tie to permit the same to be pulled from underneath the rail. Moreover, when a part of the ballast is removed, it cannot be replaced to have the same density as that part which was not removed or softened by picking, and, therefore, the tie will settle on that side where the earth was originally removed, and replaced, and will tend to roll out of position with the result that the tie does not thereafter properly support the rail, the final result of which is irregular or uneven track. In handling ties which carry rail chairs or tie plates, it is a general practice to remove the plates and the rail must be raised so that the plate can be withdrawn. This is an expensive operation because the plate has generally become deeply embedded in the tie. In practicing my invention the tie is cut at a point adjacent the inner end of the plate and between the rails, and the end section of the tie thus released can be drawn in an endwise direction while the plate remains embedded. Thus the troublesome and expensive operation of rail lifting and plate prying is eliminated. Moreover, the cutting of the tie gives a greater salvage value, because it is in three pieces and is, therefore, in convenient lengths for handling. Moreover, when the tie is severed in three parts, it may be more conveniently used as a fuel.

As illustrative of the economic value of the method:

In digging out a tie, about three cubic feet or one-ninth of a cubic yard of ballast is picked loose and shoveled away from the side of the tie to make a depression of sufficient size to receive the tie after it is pulled in a direction longitudinally of the rail by hand. The same amount of material must be replaced, packed, and leveled down, after the new tie is placed. This results in handling of two-ninths of a cubic yard of ballast for each tie removed. Therefore, for nine ties removed, two cubic yards of ballast is handled. This is an expensive operation and the present method very materially reduces the cost of taking out the old ties, inasmuch as they can be cut and removed in a direction longitudinally of the tie without disturbing the ballast. One of the main advantages, however, is that the old tie can be removed and a new one put in its stead without digging out a portion of the ballast longitudinally of and at one side of the tie, thus leaving a bed of even density into which the new tie can be introduced, only a small amount of re-ballasting being necessary.

Some of the particular objects of my invention are, to provide a wheeled frame, and tie-cutting mechanism upon said frame, said frame having track-engaging wheels; to provide means adjustable for raising and lowering the frame with relation to the wheels; to provide a saw or saws mounted and arranged to be fed vertically through the tie and to be reciprocated in a direction transversely of the tie during feeding; to provide a device having a plurality of saws for severing a tie transversely at at least two points between the rails; to provide for selectively adjusting the degree of reciprocation of the saws according to the width of the tie; to provide means for engaging the tie and anchoring the wheeled frame during the cutting operation; and to provide connections between the saw reciprocation adjusting means, and the anchoring means, whereby the engagement of said anchoring means, with the tie at a certain point will set said adjusting means, to obtain proper degree of saw reciprocation, conformably to the width of the tie adjacent that point.

Features of the invention as means for carrying out the method, include the detailed construction of the parts as well as the combinations and sub-combinations of the parts. Features also include the provision of saw-supporting guides reciprocable in direction substantially parallel with the rails as well as the details of the mechanism for operating the guides and for changing the degree of oscillation of the guides.

Still other and more specific objects, features, and advantages of the machine will be pointed out in the description of the drawings forming a part of this application, and in said drawings:—

Fig. 6 is a detail plan view showing the operation of the grab hook.

Fig. 7 is a vertical section of the grab hook construction showing the hook engaged with the tie.

Fig. 8 is a view similar to Fig. 7, but showing the hook disengaged and raised.

Fig. 9 is a detail view of the saw guide.

Fig. 10 is a plan section on the line 10—10 of Fig. 9.

Fig. 11 is a vertical section on the line 11—11 of Fig. 9.

Fig. 12 is a detail face view of the lower end of the saw blade.

This application is refiled for abandoned application, S. N. 143,145, filed Oct. 21, 1926.

The device provides a rectangular frame structure constructed principally of angle iron material, and comprising corner posts 1 having their concave sides facing inwardly, and said posts being cross connected at their lower ends by irons 2, 3, see Figs. 1, 2, 4, and 5. The transversely arranged irons 2 have their concave sides facing inwardly and upwardly and are attached at the inner sides of the corner irons 1, while the corresponding faces of the end irons 3 face outwardly and downwardly, and these irons are connected at the outer side of the posts 1. The irons 3 are attached at a level above the lower ends of the corner posts, substantially at the level of the rails, see Fig. 1, while the irons 2 are attached substantially at the lower ends of the posts 1.

Figure 3:
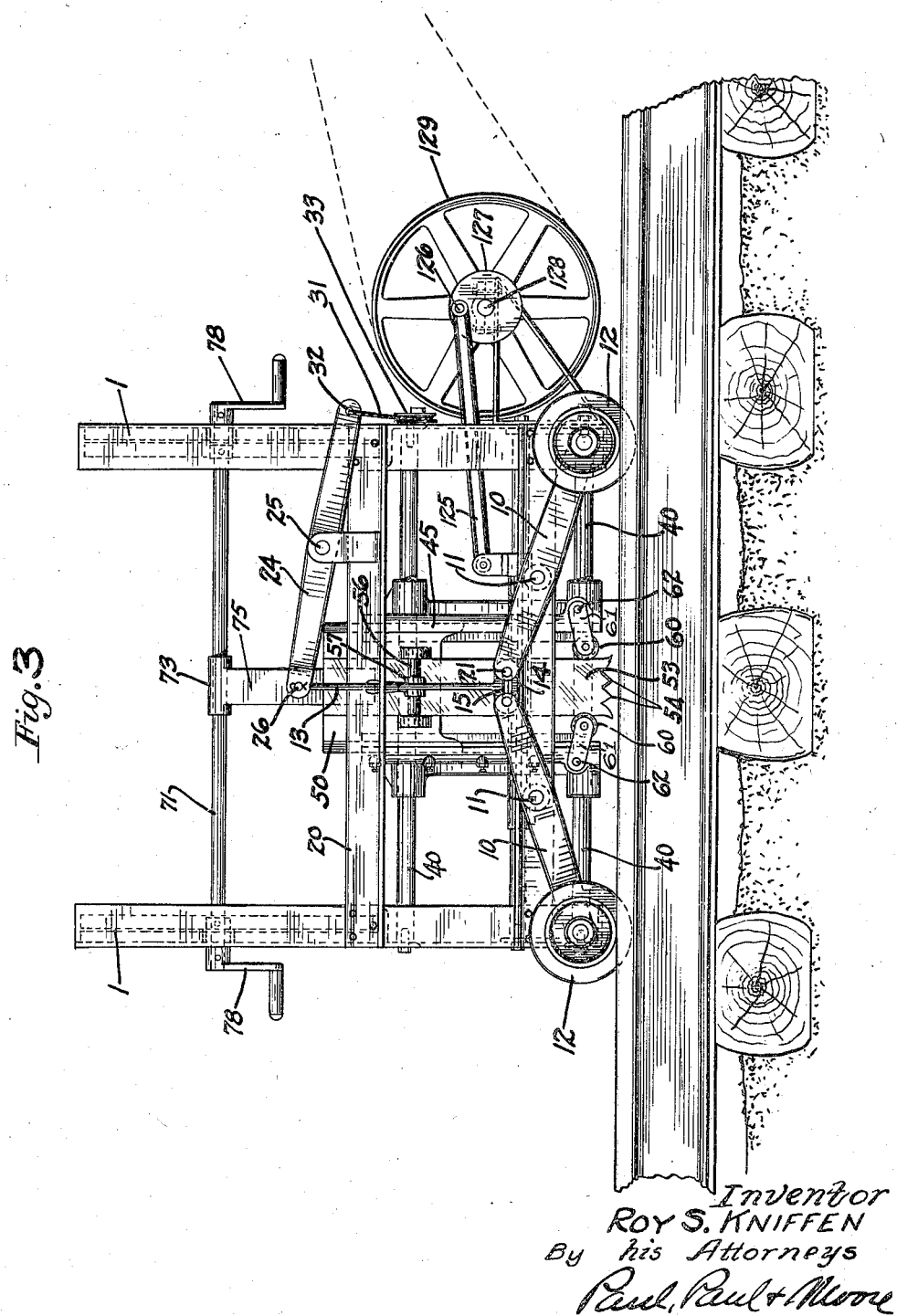
Fig. 3 is an end elevation showing one position of the pivoted rail-engaging wheels.

The frame has flanged wheels, the wheels being mounted on intermediately pivoted levers to permit raising and lowering of the frame away and toward working position. This provides means whereby the frame may be raised when it is desired to move said frame along tie-supported rails from one tie to another. For this purpose, pairs of intermediately pivoted levers 10, see Fig. 3, are provided, one pair upon each of oppositely related irons 3, and upon those sides which lie parallel with the rails. The pivot is indicated at 11. Each lever at its outer end has journaled thereto, a flanged wheel 12, this wheel, therefore, being journaled at one side of the pivotal point of the lever with the frame. The inner ends of the levers of each pair are adjacently disposed, and a link 13 having a head 14, slotted as at 15 is arranged for loose vertical reciprocation through the flange of an angle iron 20 connecting the post 1 above the iron 3 in the frame. Pivots 21 connect the levers with the slot 15 of the slide so that vertical reciprocation of the slide simultaneously operates both levers. The raised and lowered positions of this lifting device are respectively shown in Figs. 3 and 4.

In order to simultaneously operate both pairs of links, operating levers 24 are pivoted intermediately as at 25 to the horizontal iron 20, and each has its inner end pivotally connected with a corresponding link as at 26. Centrally of one of the upper transverse irons 19, (see Figs. 1 and 2) is pivoted as at 27, a hand lever 28, having suitable rack and pawl device 29, 30 for holding the lever in its set positions. Flexible running connections 31 are provided between the lever and the rock arms 24, the connections being made at opposite sides of the pivot 27 of the hand lever, and being extended in opposite directions from the lever to connect with the outer ends of the arm as at 32, see Fig. 3. Suitable guide rollers 33, are provided as shown for the running connections, see Figs. 1 and 2. As will be seen, when the hand lever is operated in either direction, corresponding simultaneous operation of the levers 24, links 13 and arms 10 will be had.

A mechanism is provided for cutting a tie at two points between the rails, so that the tie is divided into three parts, to permit ready removal of those portions lying beneath the rails. For this purpose, are provided vertically superposed pairs of horizontal slide bars, one pair on each side of the frame parallel with and adjacent the rails. These slide bars 40 may be secured in any suitable manner but in this instance are shown as secured by screws 41 engaging in the ends of the bars and passing through the flanges of the vertical members 1 of the frame, see Fig. 5. Mounted upon each pair of rods is a saw guide 45. These saw guides as castings of frame-like configuration are identical in construction and therefore the description will refer to one only.

The direction of reciprocation of the slides is the same as the direction of travel of the frame, or in a direction parallel with the rails, so that a saw properly positioned and held within the guides will cut a tie transversely.

Each guide comprises the framelike structure best shown in Figs. 9 to 11. The frame as a casting is suitably machined to provide two pairs of slides or guideways 46, 47, outer and inner, members or corresponding pairs of ways being aligned in direction of reciprocation of the slide, and being vertically disposed and arranged symmetrically at opposite sides of the vertical axes, see Fig. 10. Within one of the guideways is engaged a platelike saw slide 50 which has beveled edges formed to fit the correspondingly shaped ways. The slide 50 is cut away at its lower end as at 51 and is of less length than the guide 45. This slide has a centrally vertically disposed saw blade receiving groove 52, in which a saw 53 is slidably and removably fitted. The saw or cutter bar, is of an elongated configuration and has teeth 54 along one of its short sides or ends. Attached to the slides transversely, is a shaft 56 bridging the saw bar 53, and having thereon a lever operable cam 57 rotatable about the shaft and adapted to engage and clamp a saw blade within the groove against the face of the groove, the lower end of the blade being suitably guided by rollers 60 journaled upon links 61, each link being pivotally connected to the guide as by a bolt 62, see Fig. 9. As a result of this construction, the lower end of the flexible saw blade is engaged adjacent and above its cutting end and is steadied at the nearest possible point to the tie. The slide 50 may be transferred from one guideway to the other, the purpose of this transfer is to arrange the saw nearer or farther away from the rail, conformably to the positions of the rail chairs. For example, those ties that support rail chairs may receive the cut at a point farther from the rails, and when no chairs are used, the cut may be made nearer the rail. It is advantageous to make the cut as near as possible to the rail to facilitate removal of the outer ends of the cut tie.

Means is provided to adjust the saw blade vertically and to feed the same. This means comprises pairs of racks 70 arranged as best shown in Figs. 1, 2, 3, and 4, in a vertical position at the inner sides and in the corners of the posts 1, with the teeth facing inwardly in a direction transversely of the frame. The racks extend a substantial distance above the irons 20. A shaft 71 having a pinion 72 at each end is rotatably supported by a bearing 73, at the upper end of an extension 75, which extension is attached at its lower end as at 76, to the upper end and inner side of the slide as shown in Fig. 11. This bearing has a sliding connection with the shaft to permit reciprocation thereon when the guide is reciprocated. The pinion 72 engages the racks as shown, and cranks 78 are provided and arranged at the outer side of the racks. The shaft 71 engages a vertically disposed guard 80 which tends to hold the shaft against outward movement, to correspondingly hold the pinions in mesh with their racks, see Fig. 1. It will be noted that the axis of the shaft is arranged centrally with respect to the guideways 46, 47 of the slide 45 so that when the slide is changed from one guideway to another, a connection of the bearing with the shaft 71 can be properly made. It will be evident that when the shaft is rotated, the slide and saw will be raised or lowered according to the direction of rotation of said shaft.

Means is provided for reciprocating the saw holders, preferably, simultaneously. This means comprises a power driven slide 84 reciprocably mounted on a pair of horizontally disposed spaced rods 85 arranged in parallel relation to the saw holder slide rods, see Figs. 1 and 5. This frame is adapted for limited reciprocation between the forward and rear sides of the frame, and is arranged centrally of the frame. Three cross irons are arranged to support the saw holder operating mechanism. A channel iron 86 is arranged centrally of the frame to rest upon the inturned flanges of the irons 2. Two angle irons 87 are arranged one at each opposite side of the central iron 86, see Figs. 1, 2, and 5. To the central iron is suitably pivoted as at 88, one or a pair of levers, 89, 89, the pivot being arranged at a point intermediate of the long dimension of the levers and both levers, when two are used, being oscillatable on the same pivot. Each lever at the outer end, has a pivotal link connection 91 with the element 98 of the corresponding saw holder 45, and each lever is further provided with a pair of vertically superposed slots 92 longitudinally arranged and extending, from that end opposite its link connection, inwardly toward the pivot. That portion of each lever having the slots, is thickened and horizontally slotted as at 97 to receive and slidably support the link 95 having its pivot slidable in the two slots thus formed as a result of the horizontal slotting. The slide is provided with oppositely extending arms 93 at the outer end of each of which is pivoted as at 94, a link 95. Each link is connected by a pin 96 with one of the levers so as to provide an adjustable connection between each lever and the power driven slide. One of the pivots of each link is, therefore, slidably adjustable to obtain different degrees of throw for the outer ends of the levers according to the width of the cut desired, and thus in conformity to the width of the tie. These adjusting links are, therefore, adapted to be moved toward or away from the pivotal point of the levers.

Figure 1:
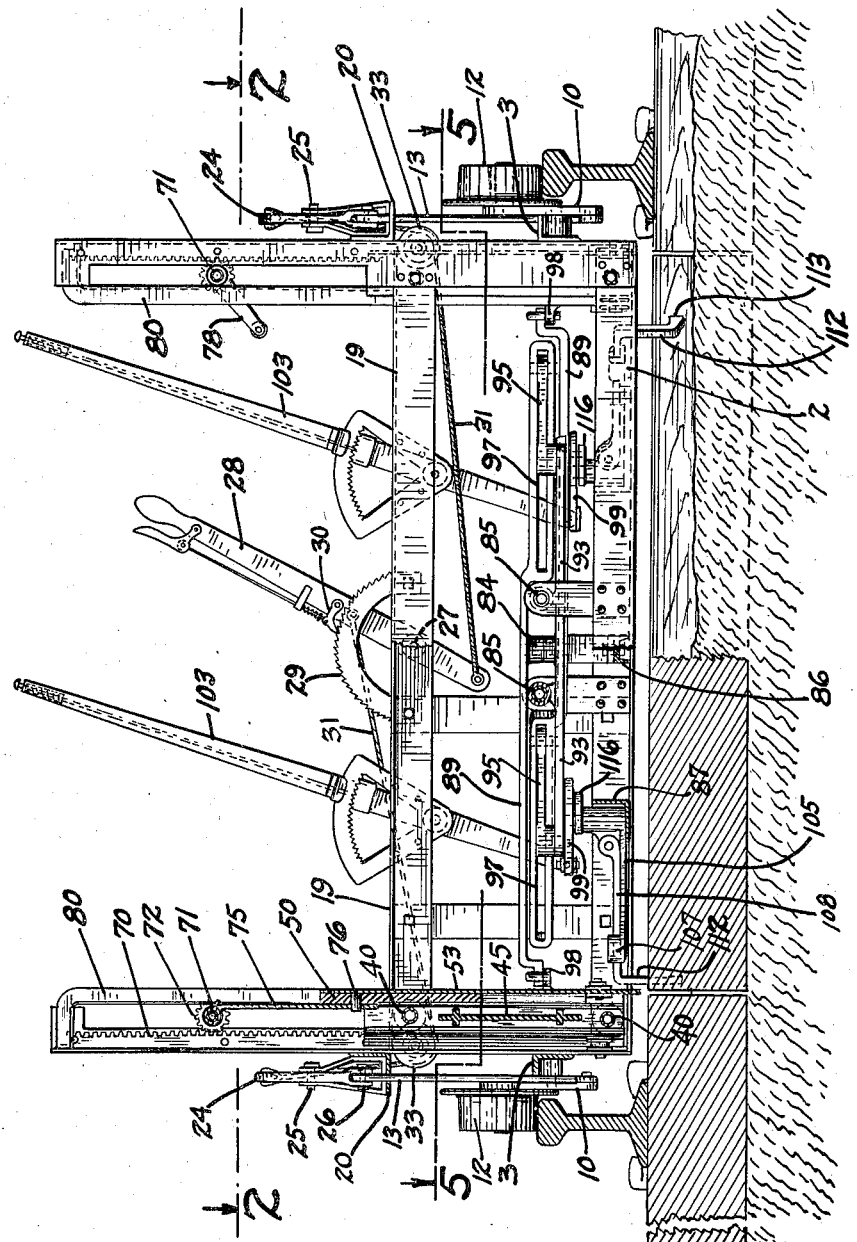
Fig. 1 is an elevation and section substantially on the line 1—1 of Fig. 2.
Figure 2:
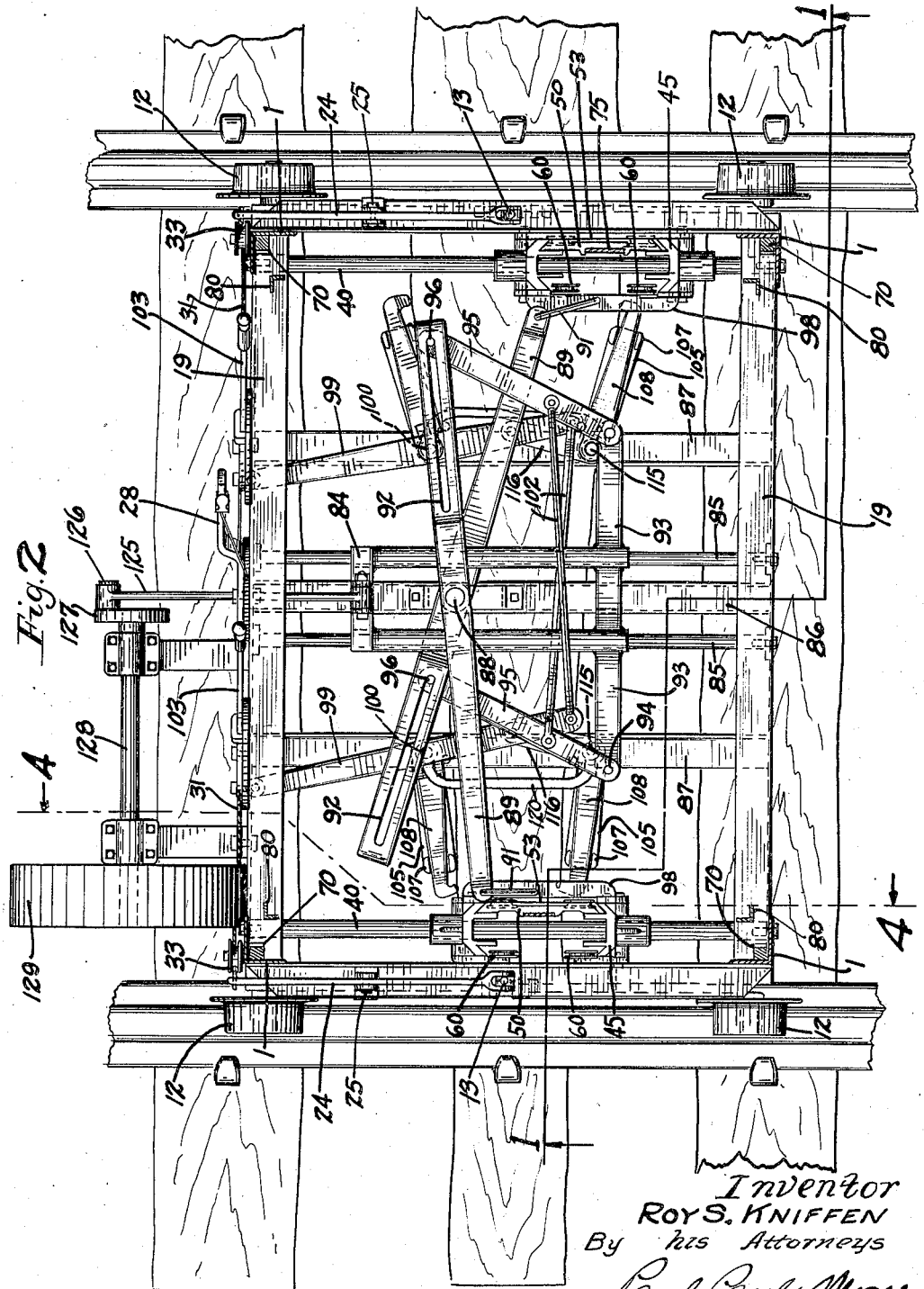
Fig. 2 is a plan section on the line 2—2 of Fig. 1.

The levers 89 are arranged at levels, one above the other, and operating rock arms 99 are intermediately pivoted as at 100, upon the flanking angle irons 87, see Figs. 2, 5, 6, 7, and 8. The levers 89 are arranged to swing in a horizontal plane one above and one below the slide 84. Each arm 99 has its inner end pivotally connected by a rod 102 with a corresponding adjusting link 95, at an intermediate point of the adjusting link. As shown in Fig. 2, the link connections extend in opposite directions. The outer end of each arm 99 is pivotally connected with the lower end of a hand lever 103 having a suitable pawl and ratchet mechanism for adjustably setting and holding the lever. Thus, independent throw adjustment for each guide-operating lever may be had.

Means is provided in the form of grab arms, arranged in pairs, for engaging the tie from opposite sides in a transverse direction to hold the wheeled frame against movement during the sawing operation. Means is further provided whereby these grab arms when in anchoring engagement with the tie automatically set the adjusting links to obtain a reciprocating throw of a corresponding saw holder in correspondence to the width of the tie. These arms are, therefore, connected to be moved into engagement with the tie during adjustment of the arm, or I may say that the engagement of the grab arms or hooks with the tie itself determines the degree of adjustment for each pair of links 95 and for the corresponding guide-operating arm.

For the above purpose, (see Figs. 6, 7, and 8) a carrier arm 105 is secured for movement with each adjusting lever 99 at its pivotal axis, the said arm having a hub 106, traversed by a pivot 100. The bottom of the arm thus rests upon and is slidably engaged with and on the top of the iron 87. This arm 105 has at its outer end a pair of upstanding stop lugs 107 between which the grab arm 108 is adapted to lie when in tie-engaging position, or when lowered to such a level that it will engage the tie. This grab arm 108 is pivoted as at 110 to the hub of the guide arm for movement in a vertical plane, and the guide arm follows the movement of the adjusting lever 99. Each grab iron bar is bent downwardly as at 112 and this bent portion has a lateral terminal spur 113 to be driven into the tie. The opposite carrier arm 105 is pivoted as shown at 115 to the iron 87 and is also provided with a grab arm 108 similar in every respect to the one previously described. However, the carrier arm 105 has a substantially right-angular extension 116 having a sliding pivotal connection as 117 with the adjusting lever 99 best shown in Fig. 5, in which only one of the saw mechanisms is shown.

It will be noted that by this arrangement, both grab arms are simultaneously moved either inwardly or outwardly according to the direction of oscillation of the control lever 103 and arm 99.

In order that the grab arms may clear the ties when they are spread, means is provided for automatically raising the arms about their horizontal pivots 110 to a position shown in Fig. 8, as they reach their outward limit when traveling in a direction away from the tie. To this end, a yoke 120 is attached at opposite ends to respective pivots 109, 115 of the levers 99, and is arranged to lie above the levers. The pivot 110 for the arm 108 with its guide has an upright extension 121 which lies between the yoke and the operating lever, and which is adapted to engage the yoke as shown in Fig. 8, as the arm approaches its outer position, to raise the arm as shown.

With the arms in the position shown in Fig. 8 and with the saw blade raised by means of the gear and rack construction, the wheeled frame may be moved to the next tie without interference by any of its operating parts. It will be noted that the arms are simultaneously swung, toward or away from the tie, by the throw adjusting mechanism, for the saw holders, and that the spacing of the tie engaging ends of the levers, determines the degree of guide reciprocation.

The slide 84 is reciprocated by means of a pitman 125 suitably pivoted at one end to the slide and pivoted at the opposite end to a crank pin 126 carried by the crank disc 127 in turn secured to shaft 128. The shaft 128 is journaled in suitable bearings, in this instance extending horizontally from at a point between the rails and transversely to the ties. The shaft 128 has a belt wheel 129. Any kind of power may be used to drive the shaft 128 to reciprocate the slide. The device shown is found convenient.

Figure 13:
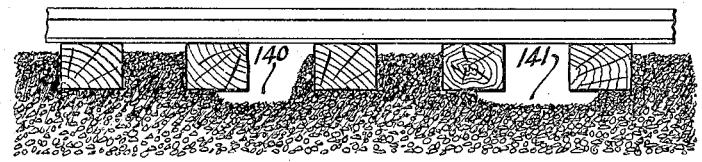
Fig. 13 illustrates the first step of the old method of removing old ties from beneath the rails.
Figure 14:
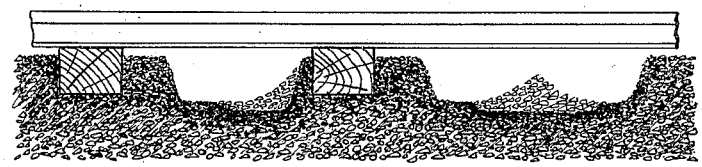
Fig. 14 illustrates another step in the old method, in which the ties are shown removed, and the replacement ballast is ready to be spread.
Figure 15:
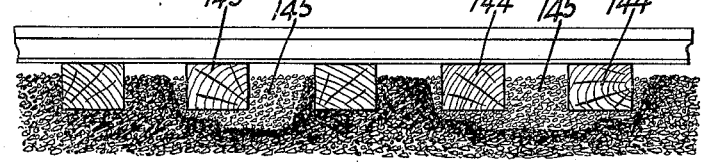
Fig. 15 shows the replacement complete with the new tie in place, and the filling and tamping completed, but with a new ballast material less dense on one side of the new tie.

Steps in the old method of removing ties are shown in Figs. 12, 14, and 15. In Fig. 13, part of the ballast material has been removed from beneath the tie and laterally along one longitudinal side to form a trench as shown at 140, 141, so that the tie or ties can be pulled laterally to drop and be disengaged from the overlying rails. It is easier for the men to dig the trench shown at 141, and thus remove two ties, one of which is frequently removed unnecessarily. In Fig. 14, new ballast material has been placed.

In Fig. 15, the new ties 143, 144 are in place with a new ballast 145 also in place. As shown, the new ballast at one side of the new tie is less dense than at the other side, and therefore there is a tendency for the tie to roll toward the less dense side. This is objectionable as has been heretofore pointed out, because uneven track results.

Figure 16:
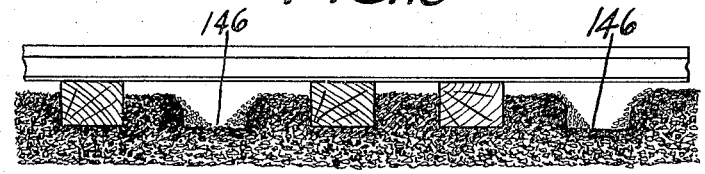
Fig. 16 illustrates the present or new method, in which the tie has been removed in a direction lengthwise and, in which the original ballast bed has therefore been left practically undisturbed.
Figure 17:
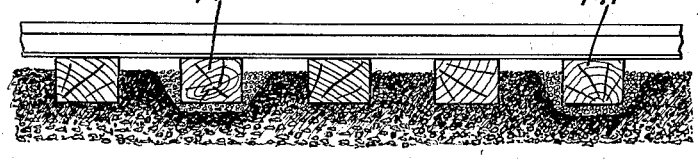
Fig. 17 shows the replacement complete, with a new tie in place, a very small amount of new ballast being of even density on both sides and bottom of the tie.

In Figs. 16 and 17, my improved method is shown, in which the old tie has been withdrawn lengthwise, leaving the ballast practically undisturbed as shown at 146 (see Fig. 16).

In Fig. 17, the new tie 147 is shown, and the ballast material is of even density at both sides and beneath the new tie.

Figure 18:
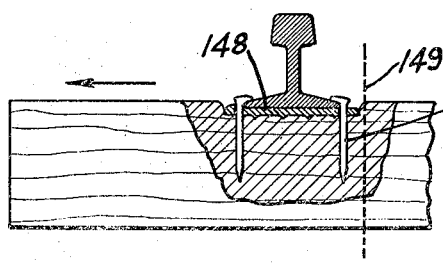
Fig. 18 shows how a rail plate becomes embedded, and further shows where the cut is made to permit removal of the tie section outwardly in a direction lengthwise of the tie, while the plate remains embedded.

Referring to Fig. 18, it will be noted that the rail plate or chair 148 is deeply embedded in the tie. This is the usual condition. By cutting the tie at a point adjacent the plate as at 149, the tie can, as soon as the spike 150 is removed, be removed in the direction of the arrow outwardly, without materially disturbing the ballast material.

Figure 4:
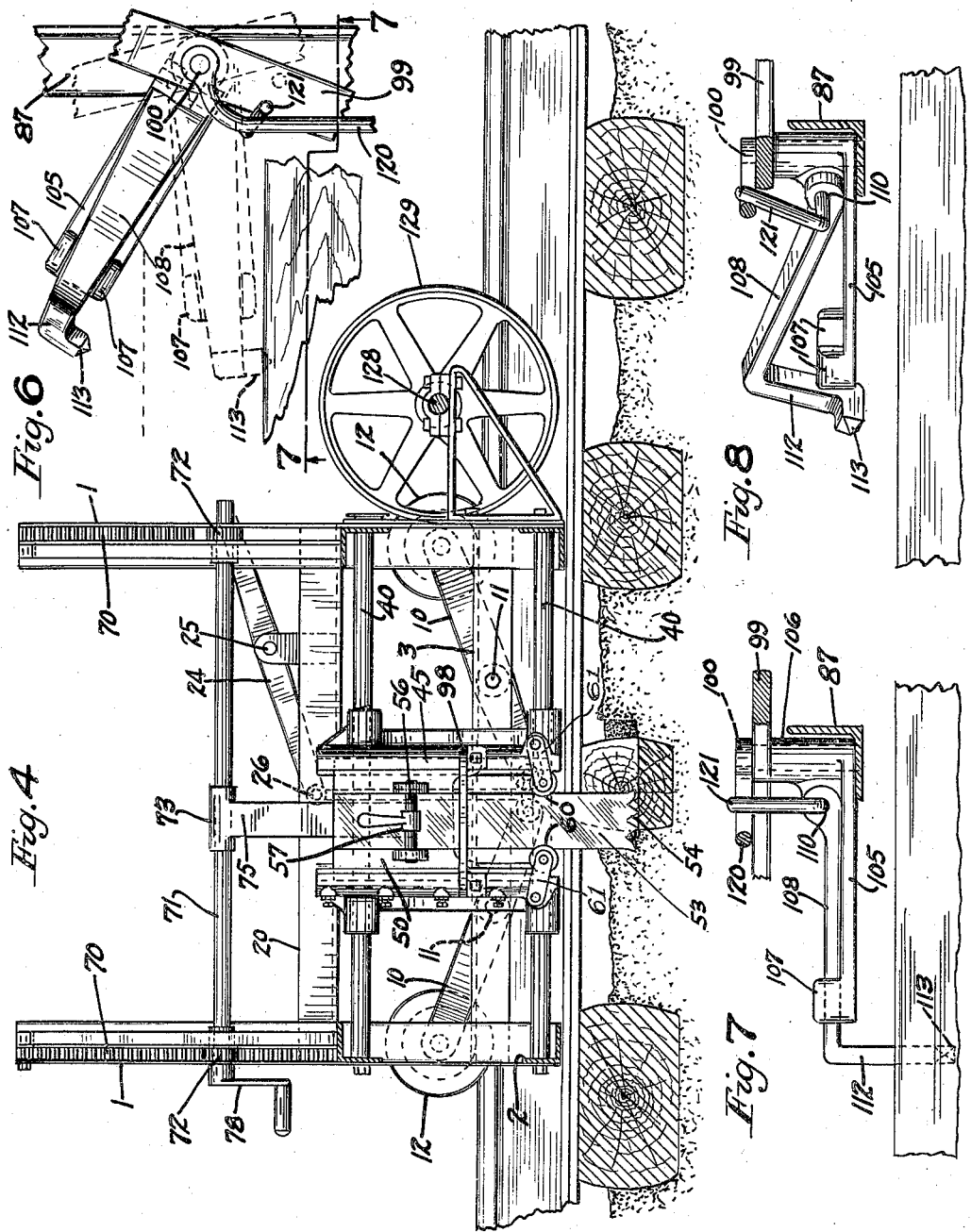
Fig. 4 is a vertical section on the line 4—4 of Fig. 2.
Figure 5:
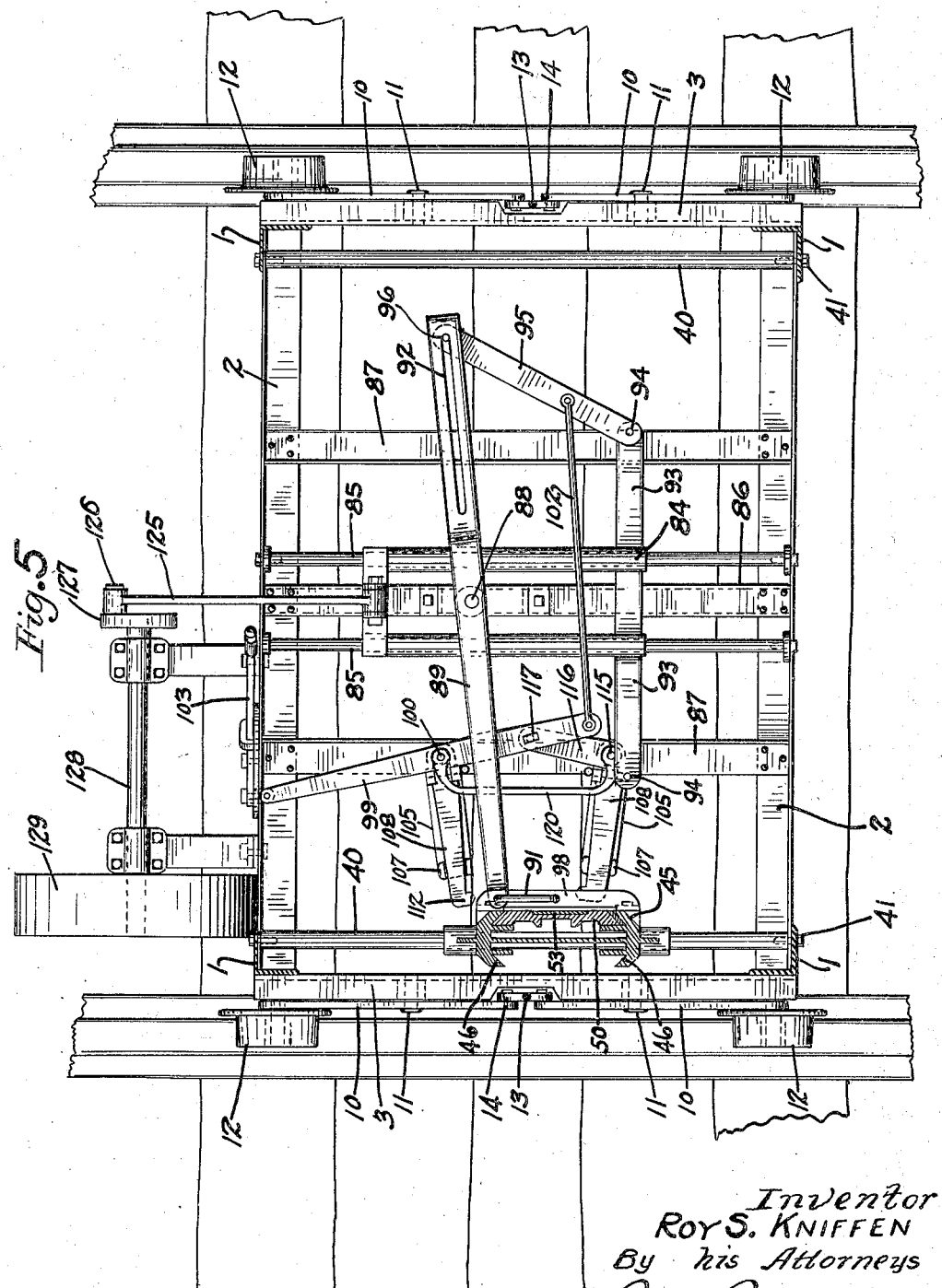
Fig. 5 is a plan section substantially on the line 5—5 of Fig. 1.

As shown in Figs. 3 and 4, the length of the tooth edge of the saw 53 is less than the width of the tie. This, in conjunction with the means for controlling the saw stroke in conformity with the tie width, prevents any substantial disturbance of the ballast (or extended engagement of the saw teeth therewith) and, therefore, the ballast does not have to be dug out longitudinally of and at the side of the ties. Thus the old bed of even density is not disturbed and the new tie can be introduced. Only a small amount of re-ballasting is necessary. The use of a saw which is of less length than the width of the tie is of advantage aside from the automatic means for controlling the length of the saw stroke, because the length of stroke can be controlled manually so as not to interfere with the ballast, and so that minimum dulling of the saw teeth results. On the other hand, the automatic control of the stroke of a saw which is longer than tie width, but which is controlled so as not to strike the adjacent ties at opposite sides of the tie being sawed, is also of advantage. The length of the saw, and control of saw stroke are, therefore, of advantage, whether used separately or in combination.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tie severing apparatus including a frame adapted to be supported above a railway track, and to be adjusted lengthwise of the track, a saw mounted upon the frame adapted to reciprocate crosswise of the tie, means for reciprocating the saw, means for feeding it vertically to sever a tie, the length of the cutting edge of the saw being less than the minimum width of the tie.

2. A tie severing apparatus including a frame adapted to be supported above a railway track, a saw mounted upon the frame and adapted to reciprocate crosswise of the tie, said saw having a cutting edge the length of which is less than the minimum width of the tie, means for reciprocating the saw, means for feeding it vertically, and means for controlling the length of sawing stroke.

3. A tie severing apparatus including a frame having wheels for supporting the frame upon the tracks above the ties, a saw and means mounting the saw for reciprocation crosswise of a tie the saw having a toothed edge the length of which is less than the minimum width of the tie, means for feeding the saw vertically during reciprocation, means for controlling the sawing stroke, means for measuring tie width, and means connecting the stroke-controlling and tie-width-measuring means, so that the stroke is controlled conformably to tie width.

4. A tie severing apparatus including a frame adapted to be supported above a railway track, a saw mounted upon the frame and adapted to reciprocate crosswise of the tie, means for reciprocating the saw, means for feeding it vertically, means for controlling the sawing stroke, means for measuring tie width and means connecting the stroke-controlling and tie-width-measuring means so that the stroke is controlled conformably to the tie width, the length of the toothed edge of the saw being less than the minimum width of the tie.

5. A frame horizontally arranged, a saw guide translatable upon the frame and arranged for horizontal reciprocation, a saw in the guide, a lever having a link connection with the guide to reciprocate the guide for a sawing operation, a slide, and an adjusting link pivoted to the slide and the lever, one of the pivots being slidably adjustable.

6. A device of the class described comprising a frame adapted to travel along a track, guides reciprocable upon the frame in a direction of travel, each guide having two sets of slide-receiving ways, outer and inner, a saw slide for each guide arranged in one of the slide ways and adapted to fit either of the ways, a saw carried by each slide, and power-operated levers having link connections with the guides to reciprocate the same.

7. A device of the class described comprising a frame having flanged wheels, guides translatably disposed upon the frame and arranged for reciprocation substantially in a direction transversely of a tie at a point between the rails engaged by the flanged wheels, a saw for each guide vertically adjustable therein, pivoted levers one for each guide and having a link rod connection therewith, a slide arranged for reciprocation upon the frame at an angle to the levers, adjusting links one for each lever pivoted to the slide and corresponding lever, one of the pivots being slidably adjustable, pivoted rock arms upon the frame each having a pivotal connection with a corresponding adjusting link, and power means for reciprocating the slide.

8. A device of the class described comprising a frame, translatably disposed saw guides upon the frame arranged for reciprocation substantially in a direction transversely of a tie, a saw slide for each guide, rack and gear connections between the slide and frame for feeding the saw slide, levers pivoted to the frame one for each guide, and having pivotal connection therewith, a slide reciprocable upon the frame, and links pivoted to the slide and lever, one for each lever.

9. A frame horizontally arranged, a saw guide translatable upon the frame and arranged for horizontal reciprocation, a saw in the guide and a lever having a link connection with the guide to reciprocate the same for a sawing operation, a slide and an adjusting link pivoted to the slide and the lever, one of the pivots being slidably adjustable, an operating lever having a pivotal connection with the adjusting link, a pair of grab arms both movable by said operating lever and arranged in pairs to engage the tie from opposite sides in a transverse direction and adapted to be moved into anchoring engagement with the tie during adjustment of the operating arm.

10. A frame having flanged wheels, translatably disposed guides upon the frame arranged for reciprocation substantially in a direction transversely of a tie at a point between rails engaged by the flanged wheels, a saw for each guide vertically adjustable therein, means for feeding the saw, levers one for each guide pivoted intermediately and having link rod connection therewith, a slide arranged for reciprocation upon the frame, adjusting links one for each lever, pivoted to the slide and corresponding lever, one of the pivots being slidably adjustable.

11. In combination with a tie supported track, a frame having wheels engaging the track, a saw upon the frame mounted for reciprocation to saw a tie transversely, means for reciprocating the saw, means for varying the degree of reciprocation of the saw-operating means, means upon the frame engageable with a tie to secure the frame against movement on the rails, and engageable with the tie width-wise from opposite sides, and connections between the securing means and said reciprocation-varying means, whereby movement of the clamping means adjusts the reciprocation-varying means to a degree corresponding to the width of the tie.

12. In combination with a tie supported track, a frame having wheels engaging the track, a pair of saw frames arranged in the frame one adjacent each track and reciprocable in a direction lengthwise of the track and having saws arranged to cut the tie transversely when the frames are reciprocated, levers upon a common pivot and connections between each lever and respective saw frame for reciprocating the frame when the levers are swung, a power-operable slide mounted upon the frame, links pivotally connecting the slides with respective levers, one of the pivots for each link being adjustable, means for moving the links separately and pairs of clamps one for each lever arranged to engage the sides of the tie in direction transversely thereof at points adjacent respective saw frames, said elements being connected with the adjusting levers and the connection being such that the adjustment is limited by the engagement of said clamping means with the tie to limit the degree of reciprocation-adjustment in correspondence to the width of the tie.

13. A frame having flanged wheels, translatably disposed guides upon the frame arranged for reciprocation substantially in a direction transversely of a tie, between rails engaged by the flanged wheels, a saw for each guide vertically reciprocable therein, a pair of intermediately pivoted levers having a common pivotal connection with the frame and extending in a direction transversely of the rails, each having a link connection at one end with a saw slide, a slide reciprocable upon a frame between and substantially perpendicularly to the levers, links one for each lever pivotally connected thereto, at that side opposite its connection with the slide, and also pivoted to the slide, and power means for reciprocating the slide.

14. A frame having flanged wheels, translatably disposed guides upon the frame arranged for reciprocation substantially in a direction transversely of a tie, and between rails engaged by the flanged wheels, a saw for each guide vertically reciprocable therein, a pair of intermediately pivoted levers having a common pivotal connection with the frame and extending in a direction transversely of the rails, each lever being pivotally connected at one end with a saw slide, a slide reciprocable upon a frame between and substantially perpendicularly to the levers, links one for each lever pivotally connected thereto, at that side opposite its connection with the slide, and also pivoted to the slide, and power means for reciprocating the slide.

15. A frame having flanged wheels, translatably disposed guides upon the frame arranged for reciprocation substantially in a direction transversely of a tie, between rails engaged by the flanged wheels, a saw for each guide vertically adjustable therein, pivoted levers, one for each guide, having link rod connection therewith, a slide arranged for reciprocation upon the frame at an angle to the levers, adjusting links one for each lever pivoted to the slide and corresponding lever, one of the pivots being slidably adjustable, pivoted rock arms upon the frame each having a pivotal connection with a corresponding adjusting link, means for adjusting and setting the rock arms, pivoted grab arms arranged in pairs to engage the tie from opposite sides, and pivotally connected with a rock arm to be moved thereby into anchoring engagement with the tie during adjustment of the arm, to correspondingly adjust the degree of reciprocation of the saw guides conformably to the width of the tie.

16. A frame having flanged wheels, translatably disposed guides upon the frame arranged for reciprocation substantially in a direction transversely of the tie, a saw for each guide vertically adjustable therein, intermediately pivoted levers, one for each guide, and having link rod connection therewith, a slide arranged for reciprocation upon the frame at an angle to the levers, adjusting links pivoted to the slide one for each lever, and adjustably pivotally connected with the lever, to move toward or away from its pivotal point, intermediately pivoted rock arms upon the frame each having a link rod connection with a corresponding adjusting link, means for adjustably setting the rock arms, pivoted grab arms arranged in pairs to engage the tie from opposite sides in a transverse direction, one arm of each pair being directly connected for movement with a corresponding rock arm, at its pivotal center, and the other arm having an adjustable connection therewith at one side of its pivot.

17. A frame having flanged wheels, translatably disposed guides upon the frame arranged for reciprocation substantially in a direction transversely of a tie, between rails engaged by the flanged wheels, a saw for each guide vertically adjustable therein, pivoted levers, one for each guide, having link rod connection therewith, a slide arranged for reciprocation upon the frame at an angle to the levers, adjusting links one for each lever pivoted to the slide and corresponding lever, one of the pivots being slidably adjustable, pivoted rock arms upon the frame each having a pivotal connection with a corresponding adjusting link, means for adjusting and setting the rock arms, pivoted grab arms arranged in pairs to engage the tie from opposite sides, and connected with a corresponding rock arm to be moved into anchoring engagement with the tie during adjustment of the arm.

ROY S. KNIFFEN.